J. KESSELRING.
Gates.

No. 200,201.  Patented Feb. 12, 1878.

WITNESSES:
C. Neveux
J. H. Scarborough

INVENTOR:
J. Kesselring
BY Munn & Co.
ATTORNEYS.

UNITED STATES PATENT OFFICE.

JACOB KESSELRING, OF BLISSFIELD, MICHIGAN.

IMPROVEMENT IN GATES.

Specification forming part of Letters Patent No. 200,201, dated February 12, 1878; application filed December 4, 1877.

*To all whom it may concern:*

Figure 1:
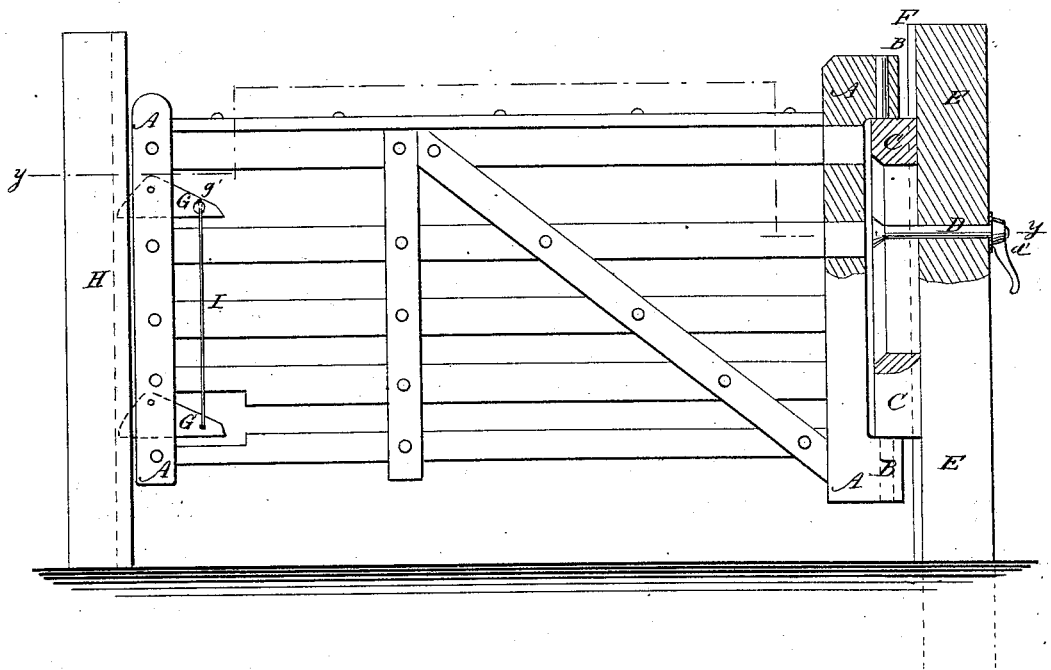
Figure 2:
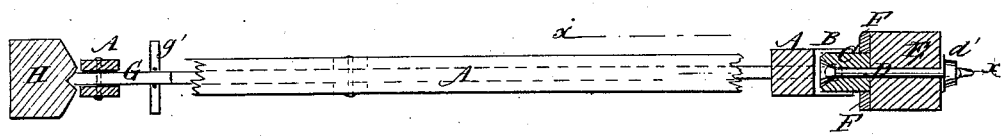

Be it known that I, JACOB KESSELRING, of Blissfield, in the county of Lenawee and State of Michigan, have invented a new and useful Improvement in Gates, of which the following is a specification:

Figure 1 is a side view of my improved gate, partly in section, through the line $x\,x$, Fig. 2. Fig. 2 is a top view of my improved gate, partly in section, through the line $y\,y$, Fig. 1.

Similar letters of reference indicate corresponding parts.

The object of this invention is to furnish an improved gate which shall be so constructed that it may be adjusted to swing at any desired height above the ground.

The invention will first be described in connection with the drawings, and then pointed out in the claim.

A represents the gate, about the construction of which there is nothing new. To the upper and lower parts of the rear side of the rear upright of the gate A are attached, or upon them are formed, blocks B, to and between which is pivoted a block or bar, C. The bar C is slotted longitudinally to receive the bolt D, which passes through a hole in the rear post E, and has a nut, $d'$, screwed upon it, so that by loosening the said nut the gate may be raised and lowered, as desired, and may be secured in place when adjusted by again tightening the said nut.

The slotted bar C is kept from turning upon the post E by two cleats, F, attached to the forward side of the said post E at the opposite sides of the said bar C.

In slots in the upper and lower parts of the forward upright of the gate A are pivoted two triangular latches, G, at their upper angles. The outer angles of the latches enter a longitudinal groove in the inner side of the front post H, so as to fasten the gate at whatever height it may be adjusted. The side corners of the post H are beveled, so that the gate may fasten itself automatically as it is swung shut from either side.

The inner angles of the latches G are made the longer, and are connected by a rod or long link, I, so that they may be drawn back together to unfasten the gate. To the upper latch G is attached a handle, $g'$, for convenience in unfastening the gate.

Having thus described my invention, I claim as new and desire to secure by Letters Patent—

The combination, with gate A, having end projections or blocks B B on the rear upright, of the slotted bar C, the pintles, the bolt and nut D $d'$, and post E, as shown and described.

JACOB KESSELRING.

Witnesses:
JACOB BUSCH,
O. F. SHELDON.